United States Patent
Dhumal et al.

(10) Patent No.: US 12,125,305 B2
(45) Date of Patent: Oct. 22, 2024

(54) USAGE AND HEALTH-TRIGGERED MACHINE RESPONSE

(71) Applicant: Avaya Management L.P., Durham, NC (US)

(72) Inventors: Pragati Dhumal, Pune (IN); Kajal Makhija, Shrirampur (IN); Tanvi Sharma, Pune (IN)

(73) Assignee: Avaya Management L.P., Durham, NC (US)

( * ) Notice: Subject to any disclaimer, the term of this patent is extended or adjusted under 35 U.S.C. 154(b) by 262 days.

(21) Appl. No.: 17/511,136

(22) Filed: Oct. 26, 2021

(65) Prior Publication Data

US 2023/0125629 A1    Apr. 27, 2023

(51) Int. Cl.
| | |
|---|---|
| G06V 40/10 | (2022.01) |
| G06F 18/214 | (2023.01) |
| G06F 18/22 | (2023.01) |
| G08B 21/02 | (2006.01) |
| G08B 21/18 | (2006.01) |

(52) U.S. Cl.
CPC ............ G06V 40/10 (2022.01); G06F 18/214 (2023.01); G06F 18/22 (2023.01); G08B 21/02 (2013.01); G08B 21/182 (2013.01)

(58) Field of Classification Search
CPC ...... G06V 40/10; G06V 10/82; G06V 20/597; G06V 40/23; G06V 20/52; G06V 10/764; G06V 40/171; G06V 40/174; G06V 40/20; G06F 18/214; G06F 18/22; G08B 21/02; G08B 21/182; G08B 21/0476; G08B 21/043; A61B 5/0077; A61B 5/7264; A61B 5/746; A61B 5/747; A61B 5/024; A61B 5/0816; A61B 5/1116; A61B 5/1117; A61B 5/1128; B60W 2050/143; B60W 2040/0872; B60W 2050/146; B60W 2540/229; B60W 40/08

See application file for complete search history.

(56) References Cited

U.S. PATENT DOCUMENTS

| | | | |
|---|---|---|---|
| 11,276,289 B1* | 3/2022 | Madden | G08B 21/182 |
| 11,282,367 B1* | 3/2022 | Aquino | G08B 21/0476 |
| 2014/0092247 A1* | 4/2014 | Clark | G08B 13/19652 348/143 |
| 2016/0073947 A1* | 3/2016 | Anderson | A61B 5/168 600/475 |
| 2017/0358200 A1* | 12/2017 | Newman | G08B 25/001 |
| 2019/0213429 A1* | 7/2019 | Sicconi | G06F 3/012 |
| 2019/0303656 A1* | 10/2019 | Lin | G06V 10/764 |
| 2020/0207358 A1* | 7/2020 | Katz | G02B 27/0093 |
| 2021/0117048 A1* | 4/2021 | Grieves | G06F 3/01 |
| 2021/0326614 A1* | 10/2021 | Zhao | G06V 20/597 |
| 2021/0383129 A1* | 12/2021 | Rosenberg | G06F 18/22 |
| 2021/0385600 A1* | 12/2021 | Fukuda | H04S 7/301 |

(Continued)

*Primary Examiner* — Michael S Osinski
(74) *Attorney, Agent, or Firm* — Sheridan Ross P.C.

(57) ABSTRACT

Systems and methods are provided that capture a user's physically observable state, such as body position. A processor analyzes the image to determine if the user's state is unhealthy and, if so whether or not the user is in the unhealthy state for longer than a threshold period of time. If the user is in an unhealthy state, the processor signals an alerting component to energize a circuit. Accordingly, the user may be prompted to alter their physical state to a less unhealthy more healthful state.

20 Claims, 5 Drawing Sheets

(56) References Cited

U.S. PATENT DOCUMENTS

| | | | | |
|---|---|---|---|---|
| 2022/0188555 A1* | 6/2022 | Park | ............ | G02B 27/54 |
| 2022/0198900 A1* | 6/2022 | Madden | ............ | G08B 21/02 |
| 2022/0253629 A1* | 8/2022 | Sun | ............ | G06V 10/761 |
| 2022/0269474 A1* | 8/2022 | Chang | ............ | A61B 5/6893 |
| 2022/0338757 A1* | 10/2022 | Kim | ............ | A61B 5/7275 |
| 2023/0060732 A1* | 3/2023 | Zhang | ............ | G06V 10/82 |
| 2023/0069758 A1* | 3/2023 | Rao | ............ | A63B 71/0622 |
| 2023/0082906 A1* | 3/2023 | Yao | ............ | G06V 10/774 |
| | | | | 382/118 |
| 2023/0119454 A1* | 4/2023 | Varga | ............ | A61B 5/412 |
| | | | | 128/204.23 |
| 2023/0179983 A1* | 6/2023 | Decrop | ............ | A61B 5/7264 |
| | | | | 455/404.1 |
| 2023/0377224 A1* | 11/2023 | Lee | ............ | G06T 7/73 |

* cited by examiner

USAGE AND HEALTH-TRIGGERED MACHINE RESPONSE

FIELD OF THE DISCLOSURE

The invention relates generally to systems and methods for activating a circuit and particularly to activating a circuit in response to attributes of an image of a user.

BACKGROUND

It is commonplace for many individuals to spend a substantial portion of their worktime and their recreational time on electronic devices like laptops, desktops, game consoles, televisions, etc. For many, the use of such electronic devices may be performed while in posture that, if held for an extended period of time, may have adverse health consequences. For example, individuals may be engrossed in an activity with an electronic device for an extended period of time without realizing that their position, posture, or absence of spectacles has put them at risk for health issues. Such issues may include headaches from eye strain, muscular strains, joint stress and misalignment, and other issues.

As an example, a user may utilize a laptop for office-related work and ignores their sitting posture. At the end of the day, the user may have a stiff or sore back and neck. Once home, the same user may use a gaming console and, again, ignore their posture or the strain on their eyes caused by not wearing their spectacles. Such ailments may compound over time and lead to more serious health consequences beyond merely being sore or fatigued.

SUMMARY

These and other needs are addressed by the various embodiments and configurations of the present invention. The present invention can provide a number of advantages depending on the particular configuration. These and other advantages will be apparent from the disclosure of the invention(s) contained herein.

The usage of electronic devices may comprise, either as an integrated component or as a linked peripheral device, a variety of sensors and other input components. Cameras, whether sensitive to visible or invisible light (e.g., ultraviolet, infrared, radio frequency, etc.) may be passively or actively observing a user, such as with ambient room lighting or via illumination with radio or other electromagnetic radiation. Similarly, mechanical wave imaging (e.g., sound/sonar) may similarly be utilized to image a user and their position in space or other physical attributes. In addition to cameras, sensors and/or actuators may be deployed in other user devices, such as wearable devices, chairs, keyboards, etc.

With inputs received from sensing components, a processor may determine if a user is in a physical state, and the duration the user is in such a state, and respond accordingly. The response is variously embodied and may include presenting a pop-up message on a computer display, an icon (e.g., a user stretching, a water glass, spectacles, etc.), movement of a chair actuator, sound from a water dispenser, audio output on speakers/headset, etc., to cause the user to address their position, posture, or other health-related usage of the electronic device. For example, an icon may be presented on a device to prompt the user to perform a quick stretching exercise after thirty minutes of stationary use of an electronic device or a water bottle icon may be presented after a period of time to prompt the user to remain hydrated and/or to get up and move around.

Electronic devices, such as laptops, desktops, gaming consoles, etc., have or may be connected to a sensing component(s), such as a camera. In one embodiment, a camera is utilized to capture an image of the user while utilizing the electronic device. The tracked images are then intelligently recognized as incorrect, harmful, health affecting, etc., such as via submitting the image(s) to an artificial intelligence (AI), for example, a neural network trained to recognize the physical state of the user. Embodiments may be implemented at a system-level (e.g., circuitry, operating system operation, daemon, etc.) and/or at an application-level, such as applications that utilize a camera (e.g., meeting application, training application, etc.). Once the system or applications detects an unhealthy user state, actions and/or alerts are provided to the user or other device to correct the issue, such as to address the user's posture, put on spectacles, take a break, get water, etc. Additionally or alternatively, the alerts and/or actions may be customized, such as to accommodate variations between individual users, times or events utilized to determine whether a response will or will not be provided, etc. Reports may be provided to the user and/or other system or personnel, to indicate the issues detected, the duration of such issues, the response provided, the user's compliance, and/or other events.

In one embodiment, a system is disclosed, comprising: an imaging component to capture an image of a user while engaged with an electronic device and provide an imager output corresponding to the image; a processor to receive the imager output and determine therefrom whether the physical state of the user matches an unhealthy physical state, upon determining the physical state matches the unhealthy physical state, the processor provides an output signal; and an alerting component comprising an electronic circuit, wherein the alerting component, upon receiving the output signal, energizes the electronic circuit.

In another embodiment, a method is disclosed comprising: capturing, by an imaging component, an image of a user while engaged with an electronic device and provide an imager output corresponding to the image; receiving, by a processor, the imager output and the processor further determining therefrom whether the physical state of the user matches an unhealthy physical state, upon determining the physical state matches the unhealthy physical state, the processor providing an output signal; and receiving, by an alerting component comprising an electronic circuit, the output signal and, in response, energizing the electronic circuit.

In another embodiment, a system is disclosed comprising: means to capture an image of a user while engaged with an electronic device and provide an imager output corresponding to the image; means to receive the imager output and determine therefrom whether the physical state of the user matches an unhealthy physical state, upon determining the physical state matches the unhealthy physical state, means to provide an output signal; and means to receive the output signal and, in response, energize an electronic circuit of an alerting component.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference to one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1A:
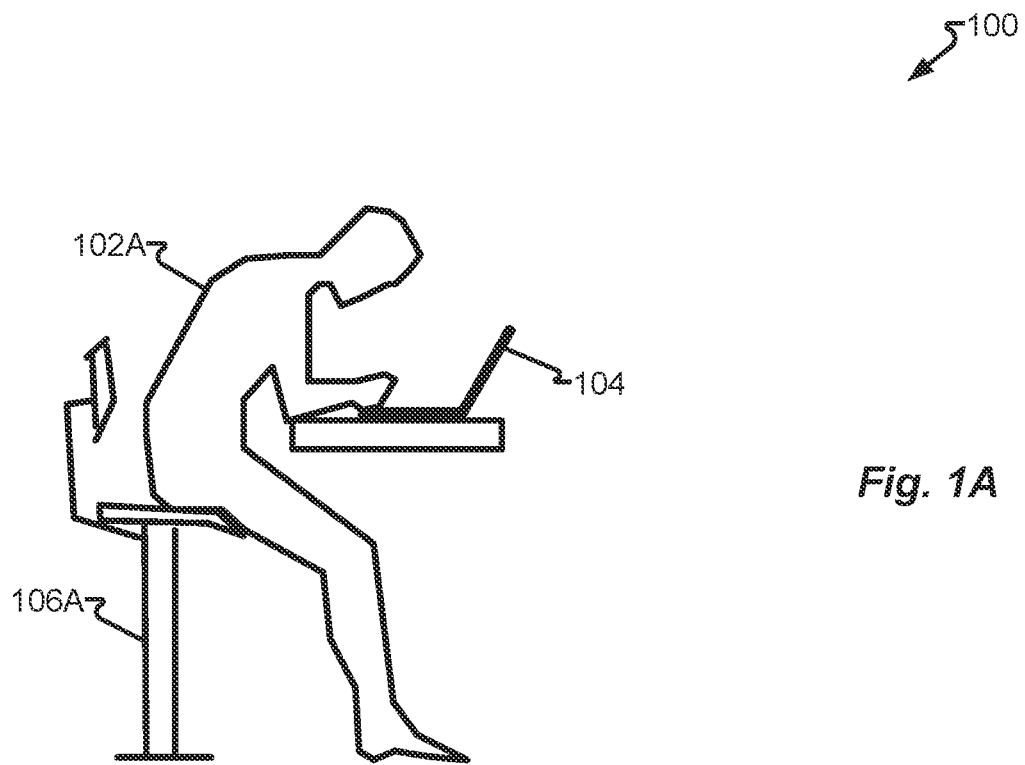
FIGS. 1A and 1B depict a user of an electronic device in accordance with embodiments of the present disclosure.
Figure 1B:
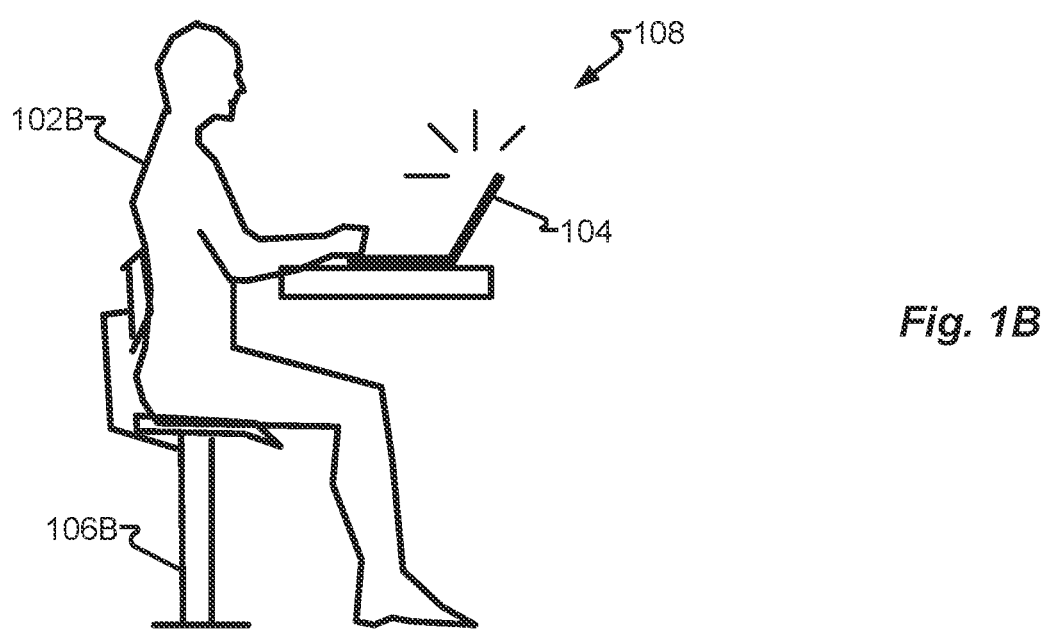

FIGS. 1A and 1B depict user 102 of electronic device 104 in accordance with embodiments of the present disclosure. In one embodiment, user 102A is in a first position (e.g., orientation and/or position of one or more of limbs, head, hands, feet, etc.) while utilizing energized electronic circuit 108 and seated on chair 106A in a first position (e.g., high). An imaging component captures an image of user 102A. The imaging component is variously embodied. In one embodiment, the imaging component comprises a camera integrated or connected to electronic device 104. Electronic device 104 is variously embodied and may comprise a desktop computer, laptop computer, mobile phone, tablet, machine, gaming console, or other device comprising a user interface for receiving inputs from user 102 and/or providing outputs to user 102.

In another embodiment, the imaging component comprises a discrete device from electronic device 104. The imaging component may be a visual camera or operable to image user 102A in non-visible wavelengths (e.g., ultraviolet, radio frequency, infrared, etc.) or mechanical wave imaging (e.g., sonar/sound waves). In yet another embodiment, the imaging component may obtain an image via positional sensors, such as those provided by wearable devices and measuring the location in space of a particular portion of user 102A and/or location or position of one portion relative to another portion (e.g., amount of spine curvature, degree of knee bend, etc.). Data from one or more positional sensors may then construct a computer-based model of user 102A and, therefrom, determine the first position of user 102A.

In one embodiment, user 102 may be a contact center agent, such as an agent located within the contact center facility. In another embodiment, user 102 may be a remote agent, such as an agent working for a contact center but located elsewhere than the contact center facility (e.g., home, remote office, internet cafe, hotel, etc.).

A microprocessor (more simply, "processor") receives the output from the imaging component, which may comprise a single image or a number of images (e.g., series of still images, frames of a video image, etc.). The processor then determines whether the user 102A in a first position is in an unhealthy position, such as a position known or reasonably suspected as causing muscle or join strain, eye strain, headaches, damage to tissue, and/or other adverse health effects. Such a determination by the processor then causes the processor to output an output signal to an alerting component. The output signal may be outputted immediately or after a delay, such as after exceeding a period of time that, after which, adverse health conditions may be realized. Additionally or alternatively, the output signal may be outputted after a non-congruent aggregation of time. For example, the output may be provided upon determining user 102A has been in a slouching continually for a period of time greater than a previously determined threshold (e.g., five minutes) or user 102A has slouched off-and-on for greater than an aggregate threshold, (e.g., ten minutes over the last hour). As another option, aggregation may comprise usage for a number of electronic devices 104 (e.g., slouching for eight minutes while using a laptop and then slouching for three minutes while using a mobile phone).

The unhealthy position that user 102A may provide are variously embodied and may include poor posture (e.g., slouching) or omission of an assistance device (e.g., brace, spectacles, etc.). In response to the output signal to the alerting component, an electronic circuit of the alerting component is energized. Such as energized electronic circuit 108 of energized electronic circuit 108, to present a message, icon (e.g., water bottle, walk, stretching/walking avatar, etc.), or other graphical element on a display of electronic device 104. As will be described more completely with respect to embodiments that follow, other energized electronic circuit 108 are provided for other electronic devices 104 (see FIG. 2).

Figure 2:
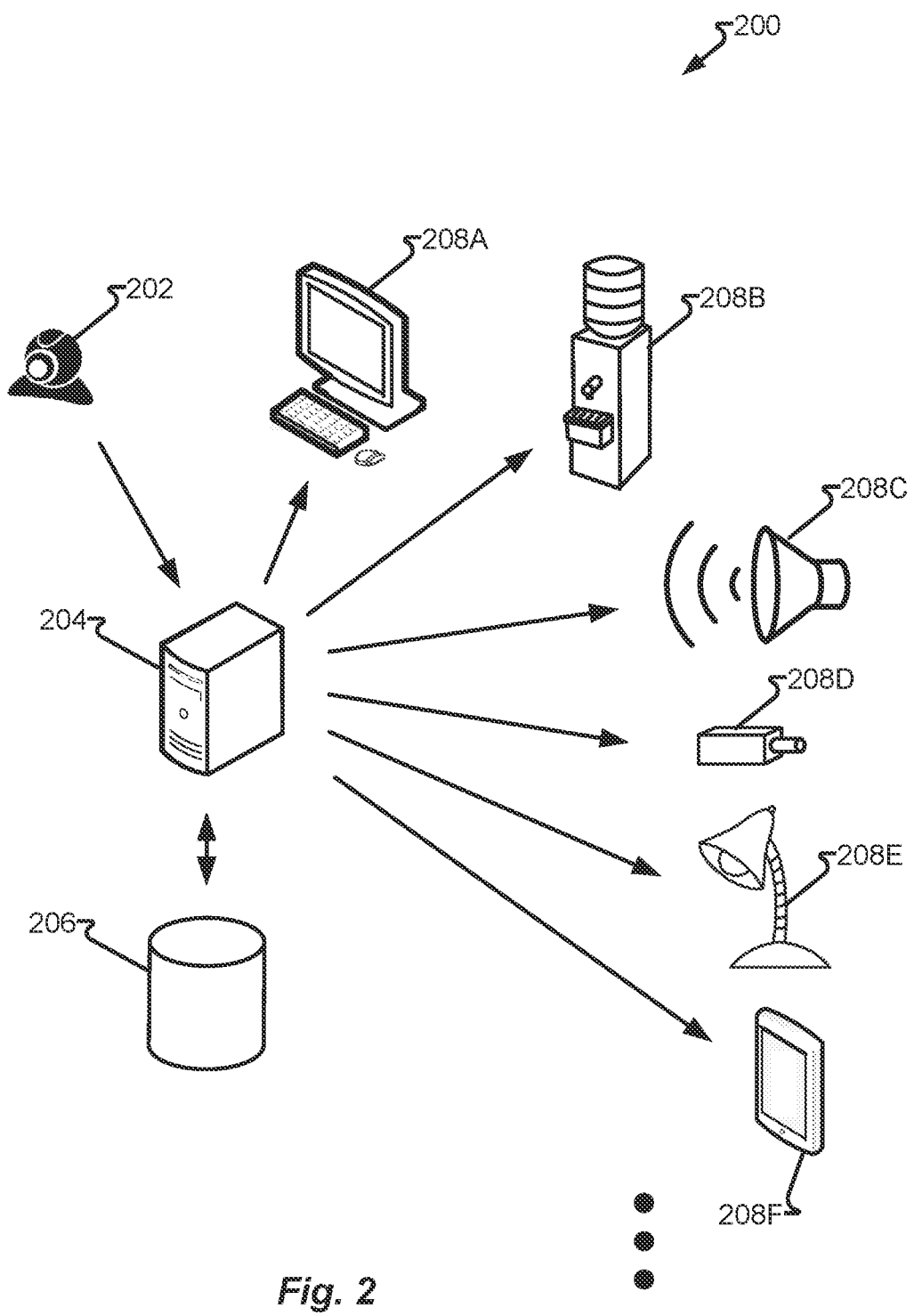
FIG. 2 depicts a first system in accordance with embodiments of the present disclosure.

FIG. 2 depicts system 200 in accordance with embodiments of the present disclosure. In one embodiment, the imaging component is embodied as camera 202 or other image capturing device or component. Camera 202 captures an image of user 102 while engaged with electronic device 104. Camera 202 provides image(s) of user 102 while engaged with electronic device 104 to a processor, such as a processor of server 204. Server 204 may comprise or access data storage 206 for storing and/or retrieving data thereon. In one embodiment, server 204 is embodied as a portion of electronic device 104.

Once the processor determines the imager (e.g., camera 202) output indicates user 102 is in a state that matches an unhealthy physical state, the processor provides an output signal to alerting component 208. Alerting component 208, in response to receiving the output signal, energizes an alerting circuit. Alerting component 208 is variously embodied. In one embodiment, alerting component 208 comprises display device 208A comprising an electronic circuit such as to present a message, icon, or other graphical element to prompt user 102 to remedy the unhealthy physical state. In another embodiment, alerting component 208 comprises water dispenser 208B, comprising an electronic circuit, such as a sound generator and/or lights to "call" user 102 to obtain water and/or change posture (e.g., move, stretch, get up from chair 106 and/or step away from user 102, etc.). In another embodiment, alerting component 208 comprises speaker 208C, comprising an electronic circuit, such as a sound wave generator to provide an audible tone or message to user 102. In another embodiment, alerting component 208 comprises actuator 208D, comprising an electronic circuit, such as a motor controller to change the position of chair 106 and/or other device that determines, at least in part, a position of user 102 and once activated, remediates the unhealthy position in whole or in part. In another embodiment, alerting component 208 comprises light 208E, comprising an electronic circuit, such as switch to turn on/off or change brightness and/or color of light 208E designed to prompt user 102 to remedy the unhealthy position. In another embodiment, alerting component 208 comprises handheld device 208F, comprising an electronic circuit, such as a graphical display and position/orientation sensor. For example, if handheld device 208F is facing upward, user 102 may be determined to be engaged with user 102 (which may further be embodied as handheld device 208F) while facing down and, placing strain on the neck of user 102 (e.g., an unhealthy position). Accordingly, handheld device 208F may omit displaying an application or other content until the angle of handheld device is changed to face more horizontal, so as to be utilized by user 102 having a more upright gaze, thereby taking strain off the neck of user 102 and being in a more healthy position. Additionally or alternatively, handheld device 208F may present a message or graphic, such as an arrow, to prompt user 102 to lift the handheld device to bring the contents of an application or other content "in to view" on the display of handheld device 208F.

Figure 3:
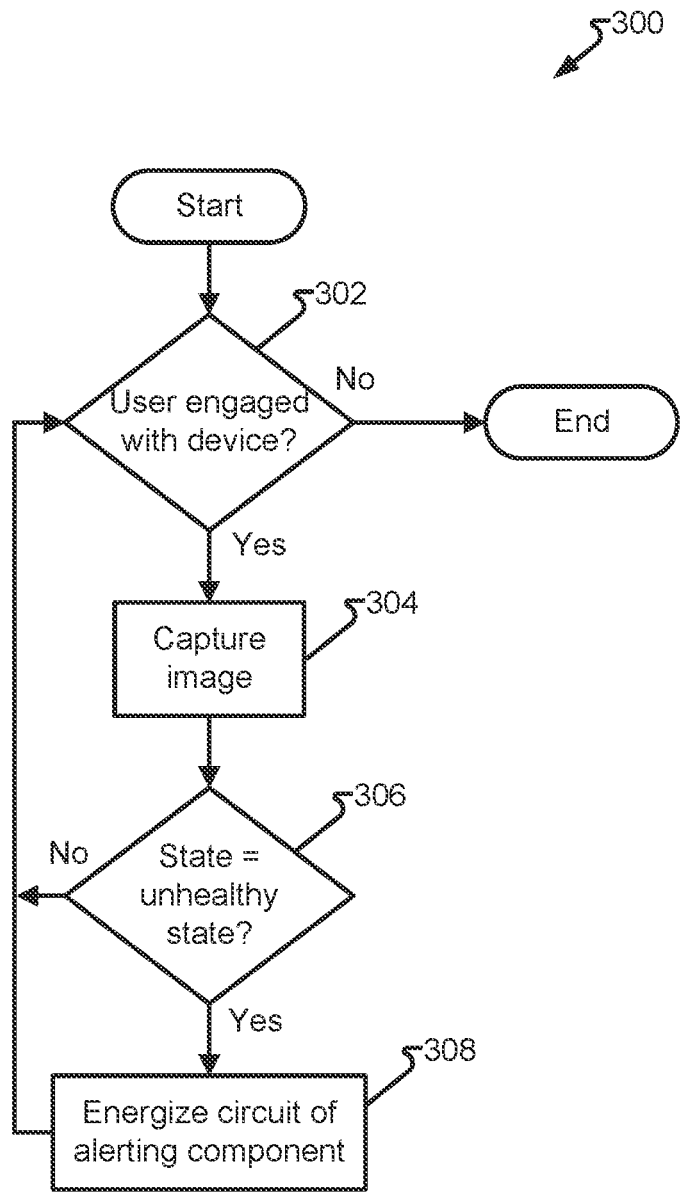
FIG. 3 depicts a first process in accordance with embodiments of the present disclosure.

FIG. 3 depicts process 300 in accordance with embodiments of the present disclosure. In one embodiment, process 300 is embodied as machine-readable instructions, that when read by a processor, such as a processor of electronic device 104, server 204, and/or other computing device, cause the processor to perform the step of process 300. In other embodiments, process 300 is embodied as circuitry. In yet another embodiment process 300 is embodied as a combination of circuitry and machine-readable instructions.

Process 300 begins and test 302 determines if user 102 is engaged with the electronic device. If test 302 is determined in the negative, process 300 may end. Alternatively, process 300 may loop back to reinitiate process 300. If test 302 is determined in the affirmative, processing continues to step 304 which captures an image of user 102. Test 306 evaluates the image and determines if user 102, as captured in the image, is in an unhealthy state. If test 306 is determined in the negative, process 300 loops back to test 302. If test 306 is determined in the affirmative, step 308 energizes the alerting circuit of an alerting component (e.g., alerting component 208).

Additionally or alternatively, step 304 and/or multiple iterations of process 300 may capture a series of images over time and, if test 306 determines that the images indicate user 102 is in an unhealthy position for longer than a threshold period of time, then executes step 308.

As further option, one or more reports may be provided to user 102 and/or other system or user. Reports may identify a particular user state (e.g., was not wearing spectacles), a duration of the state, number of occurrence of an unhealthy state for a particular time period, alerting action provided, response to the alerting action, any and/or type of subsequent alerting action provided when the user image did not show a deviation from the unhealthy state after the first alerting action, etc.

Figure 4:
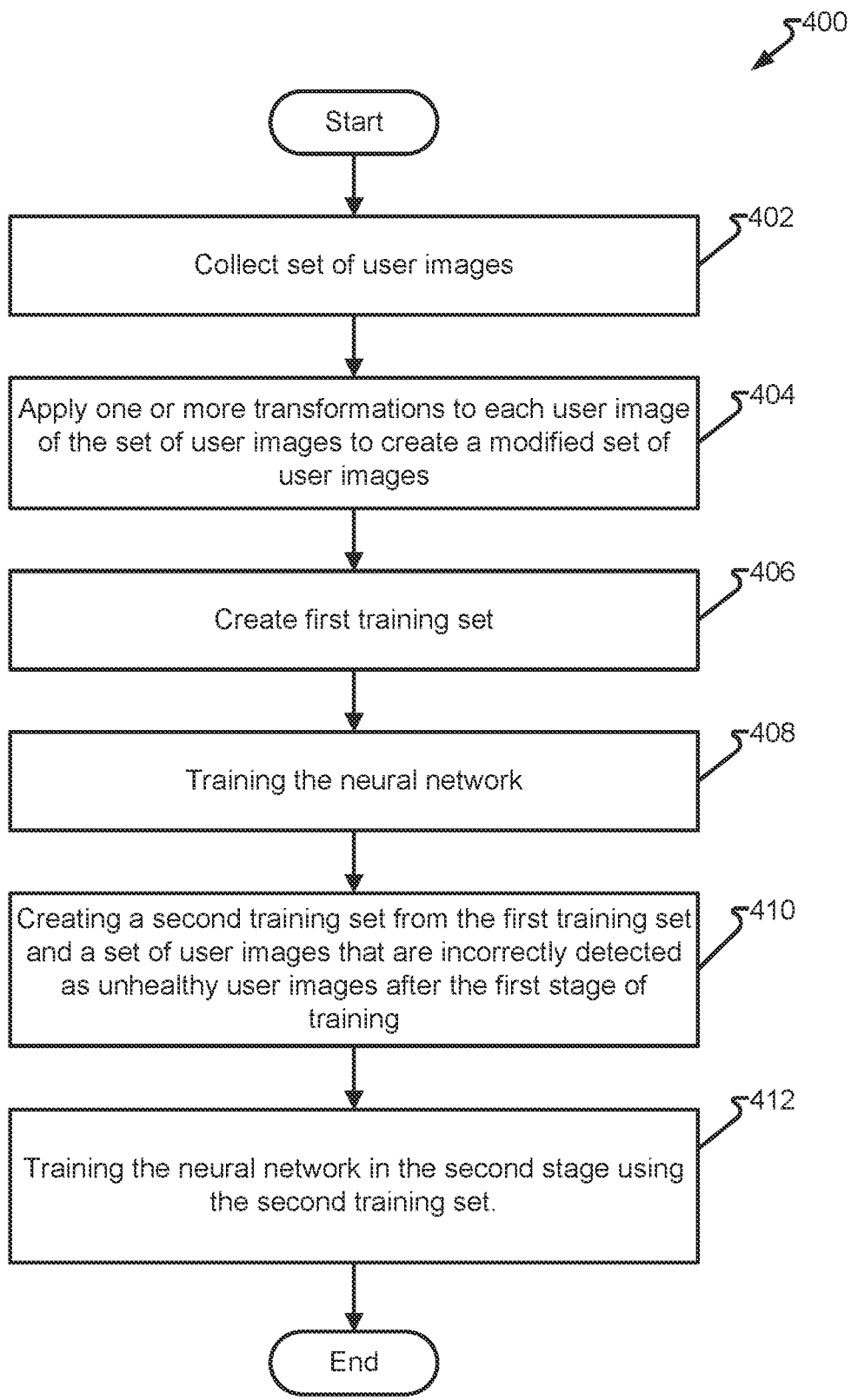
FIG. 4 depicts a second process in accordance with embodiments of the present disclosure.

FIG. 4 depicts process 400 in accordance with embodiments of the present disclosure. In one embodiment, process 400 is embodied as machine-readable instructions, that when read by a processor, such as a processor of electronic device 104, server 204, and/or other computing device, cause the processor to perform the step of process 400. In other embodiments, process 400 is embodied as circuitry. In yet another embodiment process 400 is embodied as a combination of circuitry and machine-readable instructions.

A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

In one embodiment, process 400 begins and, in step 402, collects a set of user images. The set of user images may comprise digital images of a number of different users in a number of different states. The states may comprise one or more of body position, orientation to an electronic device, presence or absence of an assistance device (e.g., brace, spectacles), etc. Step 404 applies one or more transformations to the set of user images to create a modified set of user images. The transformations comprise at least one of mirroring, rotating, smoothing, sharpening, blurring, altering contrast, altering brightness, and altering color saturation. Step 406 creates a first training set comprising the set of user images and the modified set of user images and, in step 408, trains the neural network in a first training stage utilizing the first training set.

Step 410 creates a second training set for a second stage of training. The second training set comprising the first training set and a set of non-unhealthy user images (e.g., user images that are absent an image of the subject user in stage that is either healthy or absent unhealthy attributes) that are incorrectly detected by the neural network as being unhealthy user images after the first stage of training. And, in step 412, training the neural network in a second training stage utilizing the second training set.

One trained, the neural network may be presented with an image(s) of a user and receive from the neural network, indicia of whether the user's physical state is unhealthy.

Figure 5:
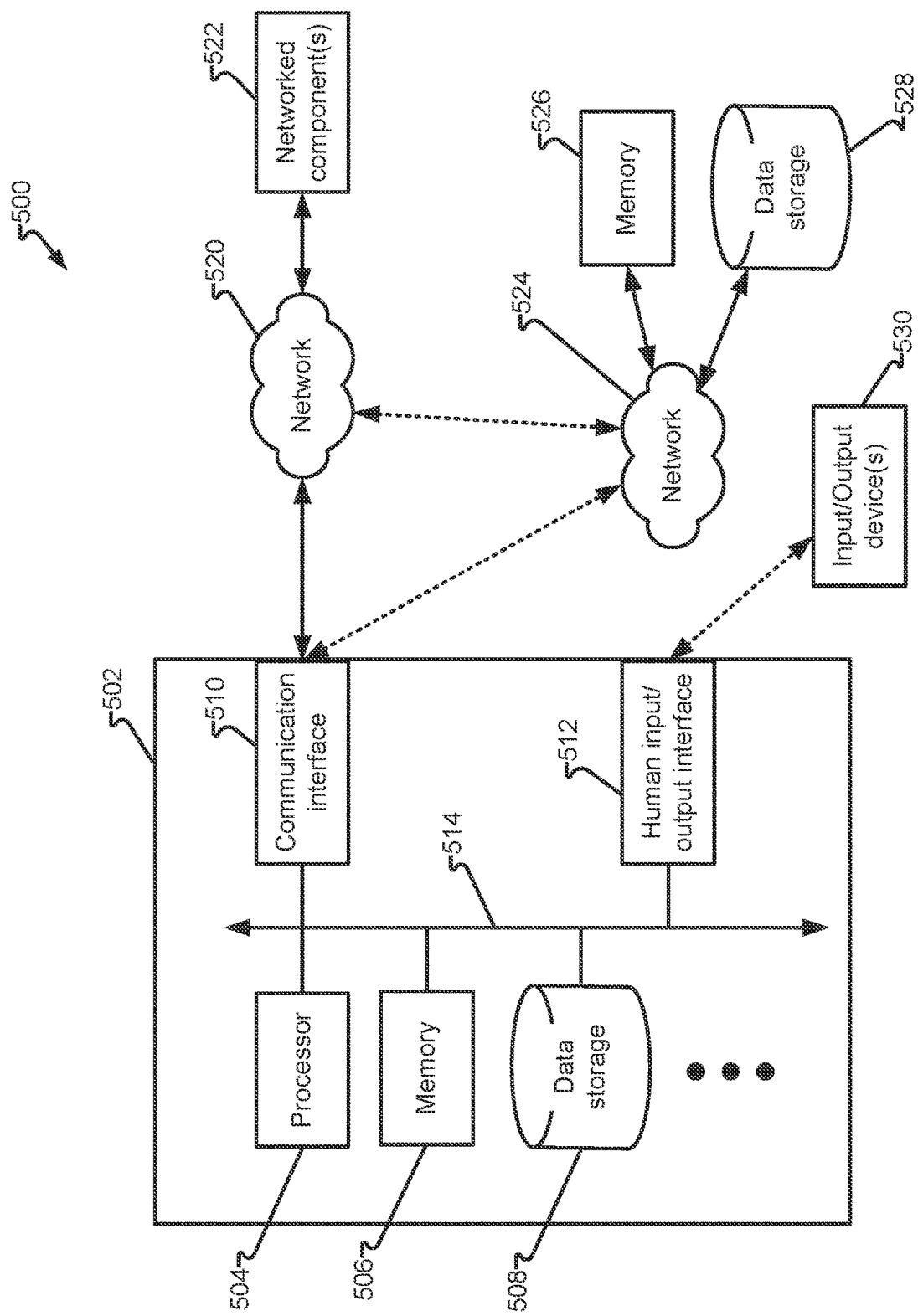
FIG. 5 depicts a second system in accordance with embodiments of the present disclosure.

FIG. 5 depicts device 502 in system 500 in accordance with embodiments of the present disclosure. In one embodiment, server 204 and electronic device 104 and may each be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may be further embodied as a single electronic microprocessor or multi-processor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor), however, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or utilize one or more networks, such as network 520 and/or network 524.

Network 520 may be a wired network (e.g., Ethernet), wireless (e.g., WiFi, Bluetooth, cellular, etc.) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.)

Additionally or alternatively, one or more other networks may be utilized. For example, network 524 may represent a second network, which may facilitate communication with components utilized by device 502. For example, network 524 may be an internal network to a business entity or other organization, whereby components are trusted (or at least more so) that networked components 522, which may be connected to network 520 comprising a public network (e.g., Internet) that may not be as trusted.

Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. For example, memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of memory 506, data storage 508, memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, switch, port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
an imaging component to capture an image of a user while engaged with an electronic device and provide an imager output corresponding to the image;
a processor to receive the imager output and determine therefrom whether a physical state of the user matches an unhealthy physical state, wherein upon determining that the physical state matches the unhealthy physical state, the processor provides an output signal, wherein the unhealthy physical state comprises an unhealthy posture, wherein the unhealthy physical state comprises the unhealthy posture associated with at least one of muscle strain or joint strain, and wherein the processor determining whether the physical state of the user matches the unhealthy physical state comprises providing the image to a neural network trained to determine unhealthy physical states and receiving a health-indicating decision therefrom; and
an alerting component comprising an electronic circuit, wherein the alerting component, upon receiving the output signal, energizes the electronic circuit; and
wherein the neural network is trained, comprising:
collecting a set of user images;
applying one or more transformations to each user image of the set of user images, the transformations including mirroring, rotating, smoothing, sharpening, altering contrast, altering brightness, and altering color saturation to create a modified set of user images;
creating a first training set comprising the collected set of user images, the modified set of user images, and a set of non-unhealthy user images;
training the neural network in a first training stage using the first training set; and
creating a second training set for a second training stage comprising the first training set and the set of non-unhealthy user images that are incorrectly detected as unhealthy user images after the first training stage; and
training the neural network in the second training stage using the second training set.

2. The system of claim 1, wherein the unhealthy physical state comprises a posture.

3. The system of claim 1, wherein the unhealthy physical state comprises an absence of spectacles.

4. The system of claim 1, wherein:
the imaging component to capture the image comprises a series of images of the user while engaged with the electronic device and provides the imager output corresponding to the series of images; and
the processor receives the imager output and determines therefrom that the physical state of the user matches the unhealthy physical state for a duration of time in excess of a previously determined period of time, wherein the duration of time is further determined by the processor utilizing the imager output corresponding to the series of images and providing the output signal in response thereto.

5. The system of claim 4, wherein:
the electronic device comprises the electronic circuit further comprising a first portion and a second portion;
the processor receives a first image of the series of images, and a second image of the series of images, wherein the second image is received after the first image;
the processor, in response to receiving the first image, determines therefrom that the physical state of the user matches the unhealthy physical state and provides the output signal comprising a first output signal;
the processor, in response to receiving the second image, determines therefrom that the physical state of the user matches the unhealthy physical state and provides the output signal comprising a second output signal;
the alerting component, upon receiving the first output signal, energizes the first portion; and
the alerting component, upon receiving the second output signal, energizes the second portion.

6. The system of claim 1, wherein the alerting component comprises a display device and the electronic circuit comprises a graphical element generator.

7. The system of claim 1, wherein the alerting component comprises a physical actuator determining at least a portion of the user and the electronic circuit comprises a position controller of the physical actuator.

8. The system of claim 1, wherein the alerting component comprises a networked component and the electronic circuit comprises an output portion of the networked component.

9. A method comprising:
capturing, by an imaging component, an image of a user while engaged with an electronic device and providing an imager output corresponding to the image;
receiving, by a processor, the imager output and the processor further determining therefrom whether a physical state of the user matches an unhealthy physical state, wherein upon determining that the physical state matches the unhealthy physical state comprising an unhealthy posture associated with at least one of muscle strain or joint strain, the processor provides an output signal, wherein determining whether the physical state of the user matches the unhealthy physical state comprises providing the image to a neural network trained to determine unhealthy physical states and receiving a health-indicating decision therefrom; and
receiving, by an alerting component comprising an electronic circuit, the output signal and, in response, energizing the electronic circuit; and
wherein the neural network is trained, comprising:
collecting a set of user images;
applying one or more transformations to each user image of the set of user images, the transformations including mirroring, rotating, smoothing, sharpening, altering contrast, altering brightness, and altering color saturation to create a modified set of user images;
creating a first training set comprising the collected set of user images, the modified set of user images, and a set of non-unhealthy user images;
training the neural network in a first training stage using the first training set;
creating a second training set for a second training stage comprising the first training set and the set of non-unhealthy user images that are incorrectly detected as unhealthy user images after the first training stage; and
training the neural network in the second training stage using the second training set.

10. The method of claim 9, wherein the unhealthy physical state comprises a posture.

11. The method of claim 9, wherein the unhealthy physical state comprises an absence of spectacles.

12. The method of claim 9, further comprising:
capturing, by the imaging component, the image comprising a series of images of the user while engaged with the electronic device and providing the imager output corresponding to the series of images; and
receiving, by the processor, the imager output and determining therefrom that the physical state of the user matches the unhealthy physical state for a duration of time in excess of a previously determined period of time, further comprising determining the duration of time utilizing the imager output corresponding to the series of images and providing the output signal in response thereto.

13. The method of claim 12, wherein:
the electronic device comprises the electronic circuit further comprising a first portion and a second portion;
receiving, by the processor, further comprises receiving a first image of the series of images, and a second image of the series of images, wherein the second image is received after the first image;
providing, by the processor, further comprises, upon receiving the first image, determining therefrom that the physical state of the user matches the unhealthy physical state, the output signal comprising a first output signal;
providing, by the processor, further comprises, upon receiving the second image, determining therefrom that the physical state of the user matches the unhealthy physical state and providing the output signal comprising a second output signal;
energizing the first portion, by the alerting component, upon receiving the first output signal; and
energizing the second portion, by the alerting component, upon receiving the second output signal.

14. The method of claim 9, wherein the alerting component comprises a display device and the electronic circuit comprises a graphical element generator.

15. The method of claim 9, wherein the alerting component comprises a networked component and the electronic circuit comprises an output portion of the networked component.

16. A system, comprising:
means to capture an image of a user while engaged with an electronic device and provide an imager output corresponding to the image;
means to receive the imager output and determine therefrom whether a physical state of the user matches an unhealthy physical state comprising an unhealthy posture associated with at least one of muscle strain or joint strain, and upon determining that the physical state matches the unhealthy physical state, means to provide an output signal, wherein the means to determine whether the physical state of the user matches the unhealthy physical state comprises means to provide the image to a neural network trained to determine unhealthy physical states and receiving a health-indicating decision therefrom; and
means to receive the output signal and, in response, energize an electronic circuit of an alerting component; and
wherein the neural network is trained, comprising:
collecting a set of user images;
applying one or more transformations to each user image of the set of user images, the transformations including mirroring, rotating, smoothing, sharpening, altering contrast, altering brightness, and altering color saturation to create a modified set of user images;
creating a first training set comprising the collected set of user images, the modified set of user images, and a set of non-unhealthy user images;
training the neural network in a first training stage using the first training set;
creating a second training set for a second training stage comprising the first training set and the set of non-unhealthy user images that are incorrectly detected as unhealthy user images after the first training stage; and
training the neural network in the second training stage using the second training set.

17. The system of claim 16, wherein the unhealthy physical state comprises a posture.

18. The system of claim 16, wherein the unhealthy physical state comprises an absence of spectacles.

19. The system of claim 16, wherein:
the means to capture the image comprising a series of images of the user while engaged with the electronic device and provide the imager output corresponding to the series of images; and
the means to receive the imager output and determine therefrom that the physical state of the user matches the unhealthy physical state for a duration of time in excess of a previously determined period of time, wherein the means to determine the duration of time further comprises means to utilize the series of images and provide the output signal in response thereto.

20. The system of claim 16, wherein the alerting component comprises a display device and the electronic circuit comprises a graphical element generator.

* * * * *